Sept. 13, 1932.   R. P. M. DAVIS   1,876,864
BRICKMAKING MACHINE
Filed Oct. 11, 1930   5 Sheets-Sheet 5
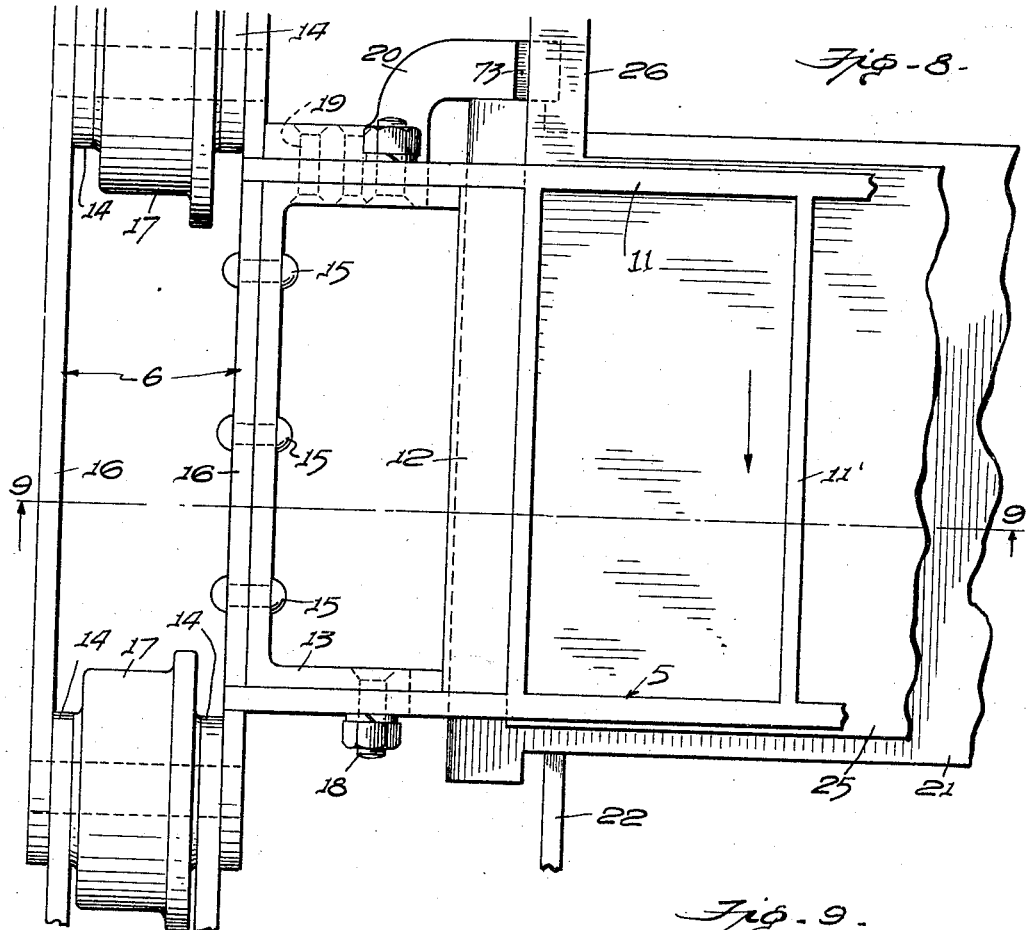
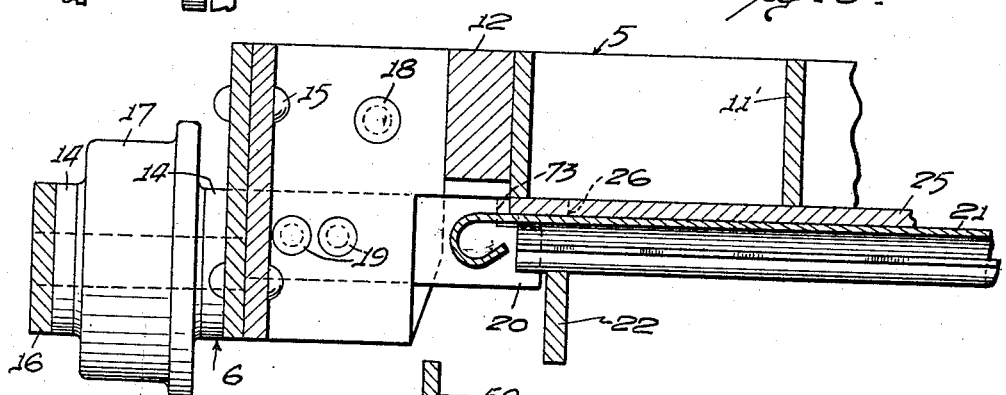
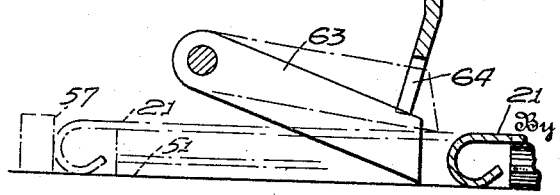
Inventor
Roy P. M. Davis
By Percy H. Moore
Attorney Patented Sept. 13, 1932

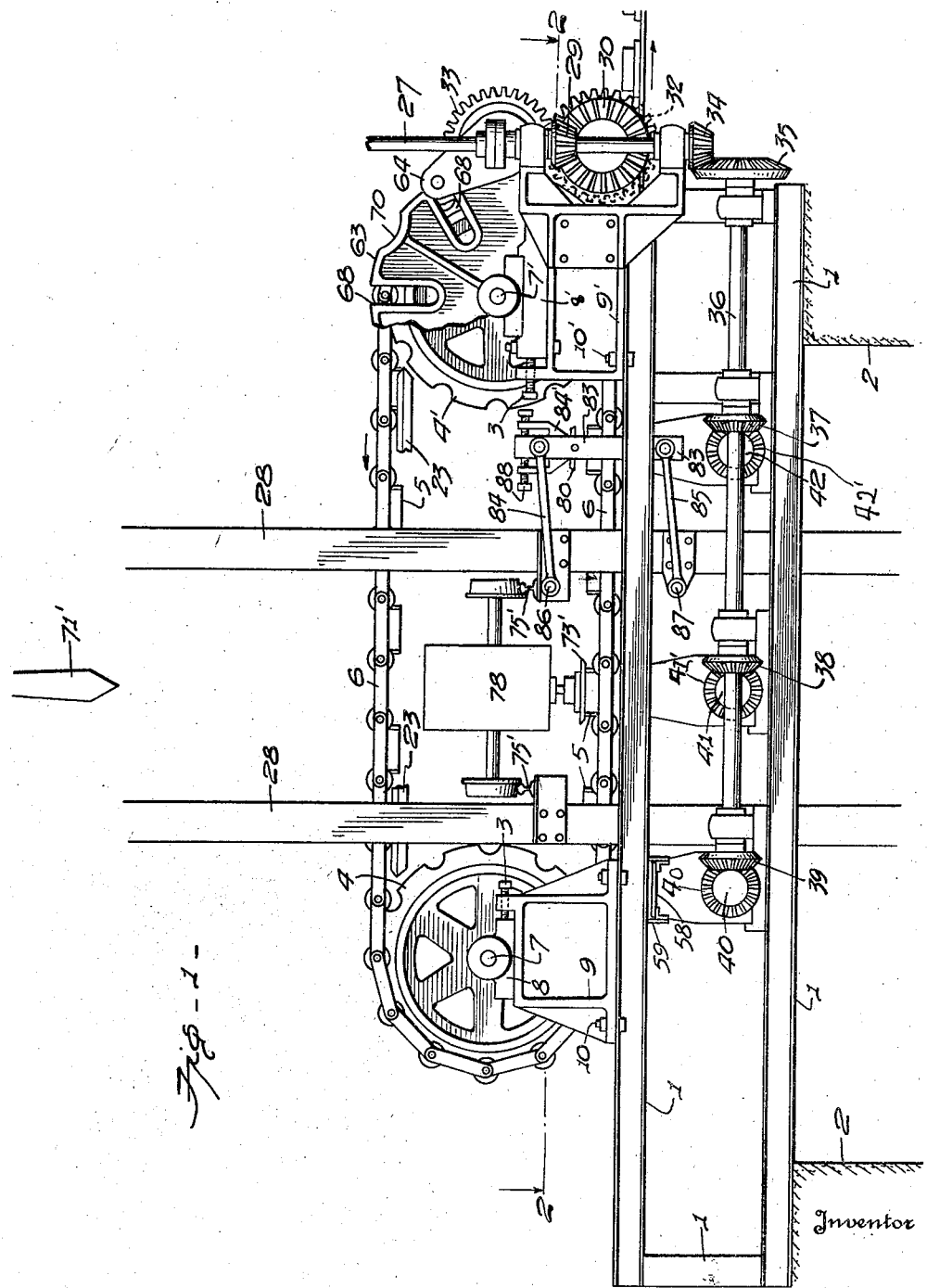

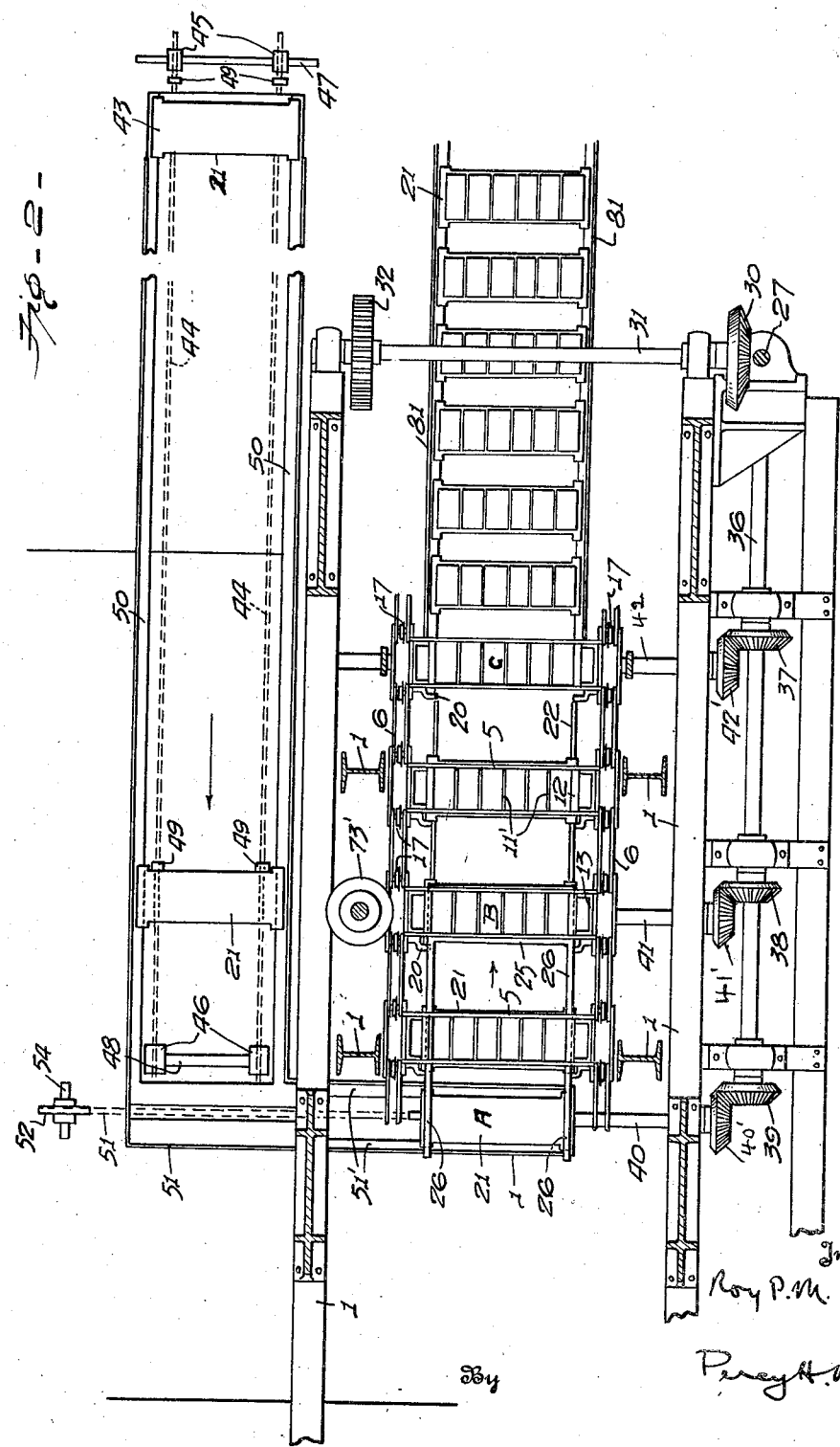

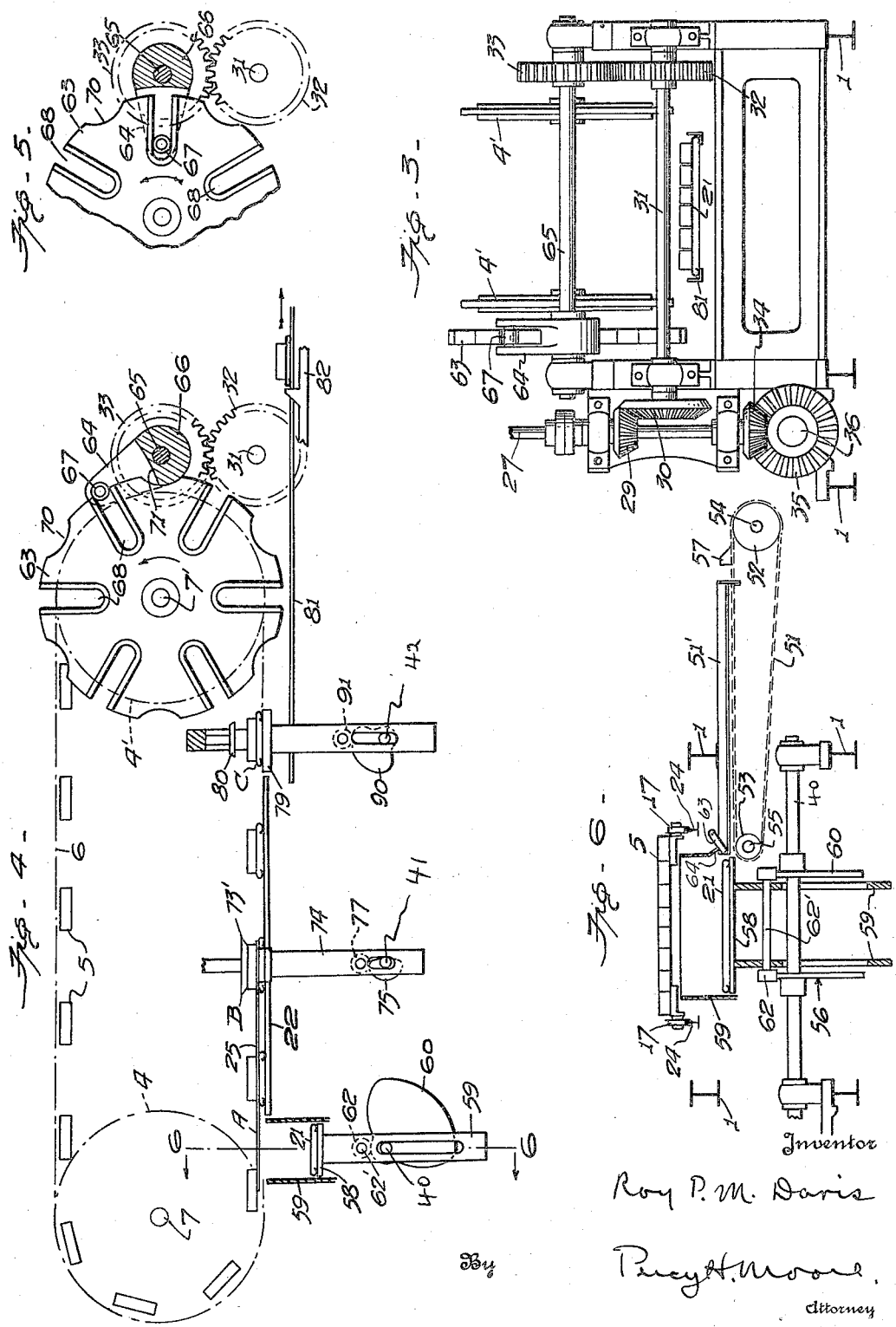

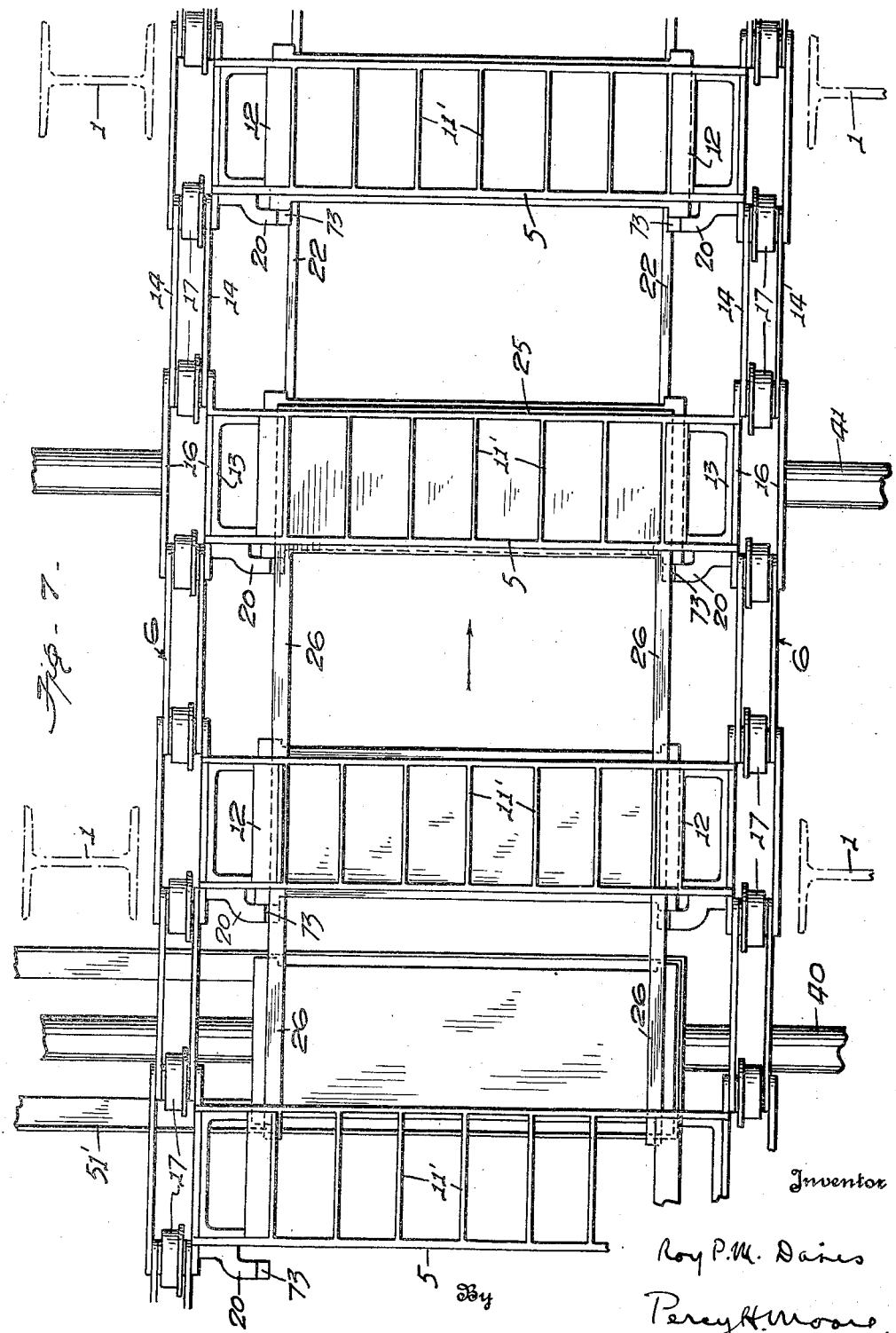

1,876,864

UNITED STATES PATENT OFFICE

ROY P. M. DAVIS, OF MOUNT UNION, PENNSYLVANIA

BRICKMAKING MACHINE

Application filed October 11, 1930. Serial No. 488,109.

This invention relates to brick making machines of the endless chain type, and its general object is to improve and perfect the work of such machines, including the filling of the molds, handling of the filled and empty molds and unloaded pallets in a more expeditious manner, during the various operations of the machine, than heretofore.

The more specific object of the invention is to so arrange the movement of the mold chain conveyor and so stagger the molds of the upper flight of the conveyor with the molds of the lower flight that the latter may be filled at the filling station with brick making material dropped from the usual overhead gravity feed hopper, with a consequent minimum splashing of material over the empty molds. Another object of the invention is to provide means for feeding the pallets to the molds so as not to interfere with the various operations of the machine or with the travel of the depending pallet lugs on the molds. A still further object is to provide an intermittent drive means for the endless chain mold carrier which permits of the various operations of the machine being successively carried out, and which will not place undue stress on the mold carrier in starting, and which will not jar the mold or cause over travelling of the latter.

With these and other objects in view, the invention consisting in the construction, combination and novel arrangements of parts, as will be fully understood from the following description, reference being had to the accompanying drawings, in which like characters of reference indicate corresponding parts throughout the several views, of which:

Figure 1 is a side elevation of the machine showing the driving and actuating mechanism for effecting mold movement and operation of other moving parts;

Figure 2 is a sectiton on the line 2—2 of Figure 1 showing the pallet feed mechanism;

Figure 3 is a view of the front or delivery end of the machine;

Figure 4 is a detail schematic view partly in section showing the various mold stations and also showing actuating mechanism for the mold chains in the idle or inoperative position assumed at the end of its working stroke;

Figure 5 is a detail view showing the mold chain actuator in the center of its drive stroke;

Figure 6 is a detail sectional view taken on the line 6—6 of Figure 4, showing the mechanism for elevating the pallets to a position beneath the molds after the pallets have been delivered to the machine;

Figure 7 is an enlarged plan view partly broken away of the mold chains with molds attached;

Figure 8 is a detail plan, partly broken away, of one of the molds, showing the cover plate and pallet in place; and Figure 9 is a section on the line 9—9 of Figure 8 showing the latch mechanism for preventing rebound of the pallets.

Referring more particularly to the drawings, 1 denotes the main frame of the brick making machine which is supported upon the floor 2 of the building in which the machine is installed. Rotatably mounted in the frame 1 are front and rear sprocket wheels 4—4' respectively which drive the two mold chains 6 mounted thereon. The shafts 7 and 7' of the sprocket wheels 4—4' are journaled in adjustable blocks 8—8' suitably mounted upon brackets 9—9' in turn secured to the frame 1 by bolts 10. The tension of the mold chains 6 is adjusted in an obvious manner by means of adjusting screws 3. Such slight adjustment of the mold chain as may be necessary is not sufficient to appreciably affect the spur gear drive hereinafter described.

Multiple compartment molds 5 comprising side bars 11, partitions 11' and end bars 12 are secured to the links of chain 6 at opposite ends by means of U-shaped clips 13 which fit snugly between the ends of the side bars 12 and are secured thereto by bolts 18 and are also secured to alternate outer links 14 of the chains 6 by bolts or other suitable fasteners 15. It will be noted that the chains 6 comprise outer and inner links 14 and 16 respectively and that between the inside links 14 rollers 17 are slung. These rollers are supported by and ride over upper and lower tracks 23 and 24 respectively. Attached to the rear end of each mold 5 by means of rivets 19 is a lug 20 which serves to advance the pallet 21 simultaneously with the mold 5 during the various operations of the machine. The spacing of the molds is such that when the mold conveyor stops with a lower flight mold at rest at filling station B, the space between the two upper flight molds next above but to one side of the lower flight mold is in line with and ample to permit a discharge of material from hopper 71', passing therethrough.

As the pallets and molds are moved along from pallet delivery station A to filling and slicking station B, in a manner hereinafter described, the pallets ride upon tracks 22 suitably supported in the main frame 1, while the bottom of the mold bears against and rides over and upon a cover or liner plate 25, the purpose of which is well known in the art. This cover plate is anchored by means of a pair of rearwardly extending ribbons 26 which are secured in any desired manner to the frame 1.

The mold chains 6 are intermittently driven from a main vertically disposed drive shaft 27 connected at its upper end to a motor or other source of power, not shown, suitably supported by uprights 28 of the main frame 1 of the machine. This shaft carries a small fixed bevel gear 29 which meshes with a large bevel gear 30 fixed to one end of a lower transverse shaft 31, the other end of which carries a spur gear 32. The gear 32 meshes with and drives a spur gear 33 fixed to a shaft 65 on which is keyed a bifurcated crank arm 64, for a purpose hereinafter described. Fixed to the lower end of main drive shaft 27 is a small bevel gear 34 which meshes with a large bevel gear 35 on a longitudinally disposed driven shaft 36 which in turn connects through bevel gears 37, 38, and 39, with the respective bevel gears 40', 41' and 42' of shafts 40, 41 and 42 of pallet delivery, filling and slicking, and stripping mechanisms. The teeth of spur gears 32 and 33 are preferably somewhat coarse so that adjustment of the tension of the mold chain will not materially affect their mesh.

Pallets 11 are supplied from a stack 43 by means of a longitudinally disposed endless chains 44 which pass over sprocket wheels 45 and 46 fixed to shafts 47 and 48, connected with the gear 32 by any suitable timing mechanism, not shown. The chains 44 are provided with lugs 49 which engage and withdraw the lowest pallet of the stack and advance it along the pallet tracks 50 to the pallet transfer tracks 51'. At this point a chain 51 mounted on sprocket wheels 52 and 53 fixed to shafts 54 and 55, and travelling at right angles to the line of travel of the mold chains 6, feeds the pallets along the tracks 51' to a pallet elevating mechanism 56, the chain 51 being provided with a pallet engaging lug 57 for this purpose. As the incoming pallet rides off tracks 51', it raises latch 63 in slot 64 formed in the well casing 59. The latch then drops down behind the pallet and prevents rebound of the latter. Shaft 54 is driven from shaft 48 by any suitable connection, not shown.

The pallet elevating mechanism comprises a plate 58 mounted for up and down movement within the guide member or casing 59, the upper end of which is positioned directly beneath the rearward end of the lower height of the mold chains 6. This plate 58, which when in its lowered or Figure 6 position receives the pallet 21 pushed along tracks 51' by lug 57, is mounted upon the top of a pair of guide bars 59'. A pair of cams 60 keyed to shaft 40, engage rollers 62 on the end of shaft 62' carried by the guide bars and raise the latter when the shaft 40 is rotated. It will be understood that the shape of the cams 60 is such that after having raised the guide bars to elevated position this position will be maintained sufficiently long to permit the oncoming mold to transfer the pallet from plate 58 to tracks 22. During the final rotation of the cams the bars 59 and plate 58 will return to lower or Figure 6 position by force of gravity.

As the major operations such as delivery of pallets to the molds; filling and slicking and stripping of the molds, must be performed while the molds are stationary, the molds must be advanced intermittently with a pause sufficiently long to permit of these operations taking place. This is effected by means of the slotted disk 63 mounted upon and keyed to the drive sprocket shaft 7', and the crank arm 64 keyed to shaft 65 to which spur gear 33' is also keyed. The crank arm 64 carries a roller 67 at its free bifurcated end which engages each of the radial slots 68 in the order of their rotation, thus rotating the slotted disks 63 and sprocket wheels 4' in an anti-clockwise direction, and also causing the lower flight of the mold chains to move forwardly toward the front or discharge end of the machine. During the period when the roller 67 is moving in one of the slots 68, the molds are in motion and while the roller is disengaged from the slot, the molds are idle. Furthermore, as the roller enters and leaves the slots 68 tangentially the speed of the disk 63 and the molds 5, is from zero to maximum and back to zero, thus causing the molds to start slowly, gradually increase in speed, and finally gradually decrease in speed until they come to a full stop. This movement imposes a minimum of strain upon the heavily loaded chains 6 in starting and consequently does not cause jerking or jarring of the filled molds during their movement from one position to another. It also guards against over travel of the mold chains and molds due to momentum.

During the idle period of the mold chains and molds, that is when the roller 67 is disengaged from the slots 68, the disk 63 is positively locked against movement by engagement of the circular hub portion 66 of the crank arm 63 in the recesses 70 formed in the periphery of the disk. The disk remains thus locked from immediately after the completion of the working stroke until the roller 67 is about to engage the next slot. A portion of the hub 66 of the crank arm 63 is cut away as at 71 to provide clearance between the hub and the periphery of the disk during the driving or working portion of the stroke.

Heretofore, in machines of the endless chain type the primary operations, such as filling and slicking, have been performed when the molds have been on the upper strand or flight position, thus making it difficult to protect the lower flight from splash mud and causing considerable interference with secondary operations, such as cleaning, sanding etc. To overcome this difficulty the upper molds are staggered with respect to the lower molds so that mud dropped from the overhead delivery chute or hopper 71' will pass between the two upper flight molds into a lower flight mold. The timing of the conveyor drive movements and the location of the discharge directly in line with the filling station B, where the molds of the lower flight stop for filling together with the spacing of the molds insures that the molds of the upper flight will be staggered with respect to the molds of the lower flight when the latter stop at station B.

Briefly stated the operation of the machine is as follows: Assuming that an empty mold 5 is being advanced by chains 6 across the top of pallet guide member or casing 59 and also assuming that a pallet 21 has been transferred from plate 58, the pallet elevating mechanism 56 will thereupon elevate the pallet into contact with the bottom of ribbons 26 which secure the cover plate 25 to the frame 1 at a point to the rear of the pallet elevating station A. The pallet having been elevated to the level of pallet tracks 22, is engaged by the lug 20 on the rear of the advancing mold and is advanced to and along the tracks 22 from pallet elevating station A to filling and slicking station B, the lug 20 being notched or recessed as at 73 to clear the ribbons and plate. During this movement the mold slides over and in contact with the anchoring ribbons 26 and then over and in contact with the body portion of the cover plate while the pallet engages and passes beneath the underside of these members.

When filling and slicking station B is reached a charge of brick making material is discharged from hopper 71' into the mold, it being understood that the rotary slicker 73' has been moved with its carriage 78, along the transverse tracks 75', to Figure 2 position, out of line with descending brick making material. A pedestal 74 which is elevated and lowered, in synchronism with the other movements, presses the pallet to cover plate and cover plate to the mold and takes up the shock of the descending material. Raising and lowering of the pedestal 74 is effected by means of a cam 75 keyed to cam shaft 41 and having engagement with a roller 77 carried by the pedestal. After the mold has been filled the slicker 73' is moved to Figure 1 position above the mold and the brick is then slicked in a well known manner, any suitable means (not shown) being employed to intermittently move the slicker carriage back and forth along the tracks 75'.

After the slicking operation the mold with slicked brick therein and its pallet are advanced to stripping station C where the bricks are pressed from the mold. At this station a vertically reciprocable table or pedestal 79 receives the mold and the pallet as these two members are advanced beyond the forward end of the tracks 22 and cover plate 25. A stripper pad 80 then descends and presses the brick against the pallet. The table or pedestal 79 then lowers the loaded pallet to the tracks 81 along which they are advanced to the racking machine (not shown) by means of a step by step pusher member 82. The stripper pad 80 is swung from a pair of guide bars 83 by means of a bracket 84' and bolts 88, the bars 83 being in turn pivoted to the free ends of arms 84 and 85, which arms are pivotally connected to the frame 1 at their other ends. Any suitable means, not shown, is employed to rock the arms 84 and 85 on their pivots 86 and 87 to raise and lower the pusher pad 80 in synchronism with the other operations of the machine. The pedestal or table 79 is raised and lowered in an obvious manner by means of a cam 90 mounted upon shaft 42 for engagement with a roller 91 carried by the table. Shaft 42 is driven from main drive shaft 27, through gears 34, 35, shaft 36 and gears 37 and 42'.

Such secondary operations as cleaning and sanding the mold after the stripping operation is effected at the upper flight position in any desirable and well known manner, not shown, during the return of the empty mold to the pallet elevating station.

Having thus described my invention, what I claim is:

1. In a brick making machine having an endless chain conveyor, molds fixed to said conveyor in substantially spaced relation to each other, overhead material discharge means positioned above the conveyor for dropping brick making material into the molds, means for driving the chains to cause the molds to be moved successively through the machine, beneath the material discharge means, the molds of the upper flight of the conveyor being staggered with respect to the molds of the lower flight, and the space between the molds being unobstructed whereby flow of brick making material from the hopper into a lower flight mold will be unobstructed.

2. A brick making machine comprising a pallet delivery station and a filling station, an endless chain mold conveyor, molds carried by the endless conveyor, intermittent conveyor driving means for moving the molds from station to station, means for feeding a pallet at right angles to the line of travel of the molds to a point beneath the mold approaching the pallet delivery station, pallet engaging means for moving the pallet in the direction of travel of the mold, and means for elevating the pallet into the line of travel of the pallet engaging means.

3. In a brick making machine having a pallet delivery station and a mold filling station, an endless mold conveyor, molds secured to the conveyor in substantially spaced relation to each other, drive means for driving said conveyor and causing molds of the lower flight of the conveyor to intermittently stop at the filling station, and in line with the space between the two molds of the upper flight of the conveyor directly above the filling station, and means positioned above the conveyor and aligned with said space and said filling station for dropping a charge of brick making material between said two molds of the upper flight to the mold at rest at the filling station.

In testimony whereof I affix my signature.

ROY P. M. DAVIS.